United States Patent [19]

Steigerwald

[11] 4,244,017
[45] Jan. 6, 1981

[54] THIRD HARMONIC AUXILIARY COMMUTATED INVERTER HAVING SELECTABLE COMMUTATION CAPACITANCE AS A FUNCTION OF LOAD CURRENT

[75] Inventor: Robert L. Steigerwald, Scotia, N.Y.

[73] Assignee: General Electric Company, Schenectady, N.Y.

[21] Appl. No.: 71,251

[22] Filed: Aug. 30, 1979

[51] Int. Cl.$^3$ .................... H02M 7/515; H02M 1/06
[52] U.S. Cl. .................................... 363/138; 363/49
[58] Field of Search ................... 363/49, 58, 96, 137, 363/138; 318/801–803

[56] References Cited

U.S. PATENT DOCUMENTS

| | | | |
|---|---|---|---|
| 4,180,853 | 12/1979 | Scorso et al. | 363/96 |
| 4,191,994 | 3/1980 | Kratz et al. | 363/138 |

FOREIGN PATENT DOCUMENTS 307472 7/1971 U.S.S.R. ................................... 363/138

*Primary Examiner*—William H. Beha, Jr.

*Attorney, Agent, or Firm*—William H. Steinberg; James C. Davis, Jr.; Paul R. Webb, II

[57] ABSTRACT

Three pairs of series-connected inverter main thyristors are coupled in parallel across a unidirectional current source with the junction between thyristors of each pair being adapted for coupling to a respective phase of a three phase wye-connected inductive load. A first and second pair of serially-connected auxiliary thyristors are coupled in parallel across the current source, with the junction between thyristors of the first and second auxiliary pairs coupled by a first and second commutating capacitance, respectively, to the load neutral. Control means, responsive to conduction of a main thyristor, render a respective one of the thyristors of the first and second auxiliary thyristor pairs conductive in accordance with inverter load current to commutate a conductive main thyristor by coupling a respective one of the first and second commutating capacitances in series with a respective load phase across the conductive main thyristor. Inverter commutation capacitance is thus varied in accordance with load current, thereby extending inverter operating range and reducing likelihood of inverter commutation failure.

6 Claims, 14 Drawing Figures

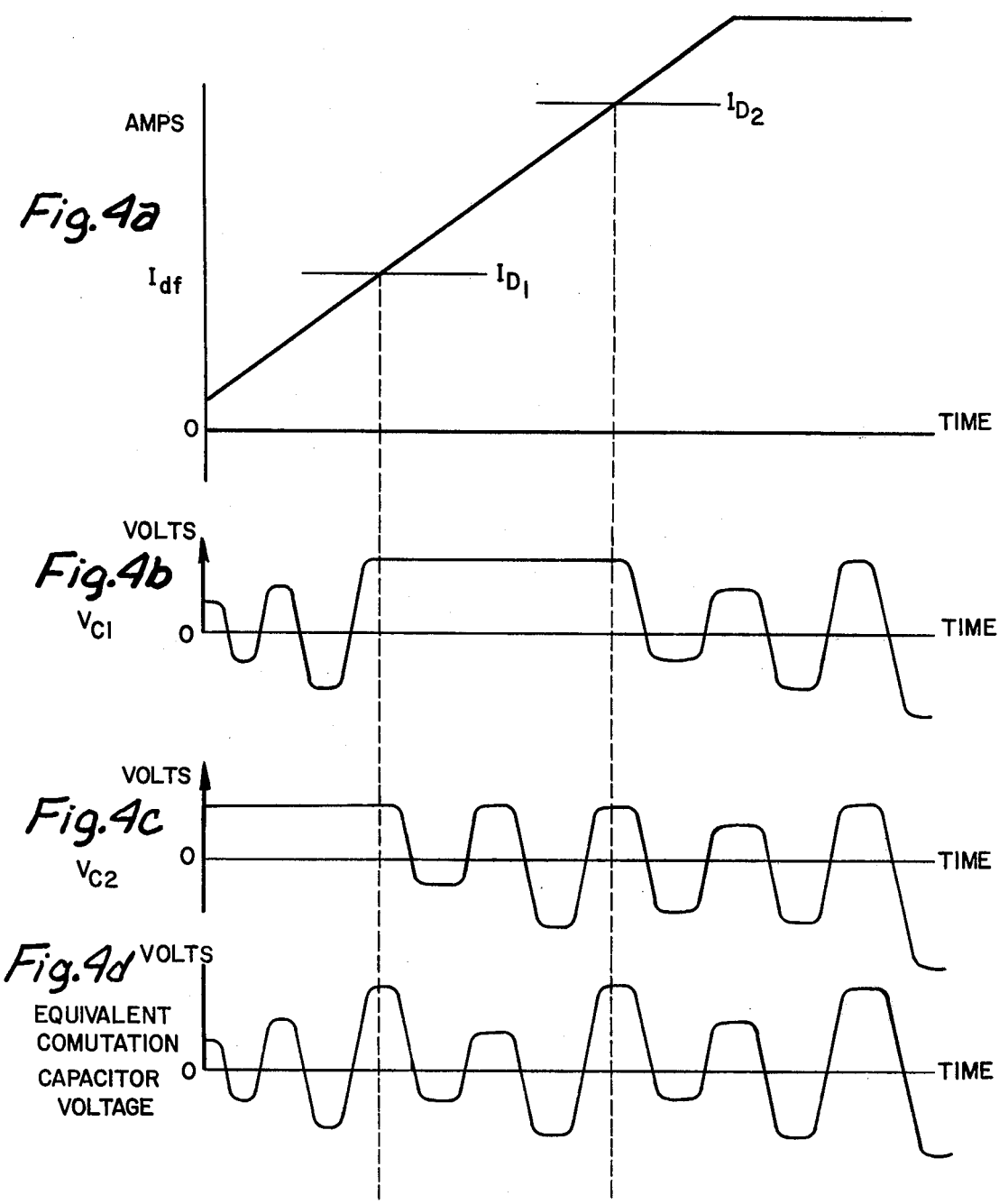

THIRD HARMONIC AUXILIARY COMMUTATED INVERTER HAVING SELECTABLE COMMUTATION CAPACITANCE AS A FUNCTION OF LOAD CURRENT

BACKGROUND OF THE INVENTION

This invention relates generally to inverters, and more particularly, to an improved third harmonic auxiliary commutated inverter having selectable commutation capacitance as a function of inverter load current, thereby providing improved inverter operation as described in my paper entitled "Characteristics of a Current-Fed Inverter with Commutation Applied Through a Neutral Load Point" published in the Conference Record of the 1978 IEEE/IAS Annual Meeting held in Toronto, Ontario, Canada during October of 1978.

Inverters are commonly used in many industrial applications where it is desired to convert potential of one frequency to another frequency, such as is required when a synchronous or induction machine is to be excited from a DC source. The simplest of all types of inverters is the three phase third harmonic auxiliary commutated inverter which can be employed to convert direct current to three phase alternating current to power three phase machines. The three phase third harmonic auxiliary commutated inverter includes three pairs of solid state switching devices, typically thyristors, with the thyristors of each thyristor pair being coupled in series aiding fashion, and each of the thyristor pairs coupled across the DC source. The junction between thyristors of each thyristor pair is coupled to a respective machine phase. A pair of auxiliary thyristors are coupled in series aiding fashion across the DC source and are coupled to the machine neutral by a commutating capacitance.

When the third harmonic auxiliary commutated inverter is employed in load commutated applications, such as in a synchronous machine drive system where the synchronous machine field is over-excited, the thyristors of the three main pairs of inverter thyristors are gated into conduction in a pre-determined sequence to supply the machine with three phase alternating current. Machine back EMF serves to commutate each of the inverter main thyristors once the machine reaches about 40% of operating speed, thus greatly reducing required inverter reactive power. During intervals when machine back EMF is of a magnitude insufficient to commutate a then-conductive main thyristor, a respective one of the pair of auxiliary thyristors is rendered conductive to commutate a then-conductive main thyristor by coupling the commutation capacitance in series with a respective machine phase across the then-conductive main thyristor.

The third harmonic auxiliary commutated inverter is also well suited for non-load commutated applications, such as induction machine drive systems. When employed in such applications, the inverter main thyristors are commutated during inverter operation by rendering an appropriate one of the pair of auxiliary inverter thyristors conductive.

The basic limitation of the third harmonic auxiliary impulse commutated inverter is that during conditions of high machine speed and low current, commutation of an inverter main thyristor may require more than 1/6 f seconds, where f is the frequency of thyristor conduction, resulting in both of the auxiliary thyristors becoming simultaneously conductive, causing a short circuit across the DC supply. Since auxiliary inverter commutation time is a function of load current, load inductance and commutation capacitance, the magnitude of the commutation capacitance largely determines the maximum inverter operating frequency, thus limiting inverter operating range.

In contrast, the present invention concerns a third harmonic auxiliary impulse commutated inverter having selectable commutation capacitance as a function of load current to provide increased inverter operating range, and reduced likelihood of inverter solid state switching device over-voltage and inverter commutation failure.

BRIEF SUMMARY OF THE INVENTION

Briefly, in accordance with the preferred embodiment of the invention, an improved current fed third harmonic auxiliary commutated inverter having selectable commutation capacitance as a function of load current for supplying alternating current from a source of unidirectional current to a wye-connected inductive load comprises a plurality of pairs of inverter main solid state switching devices corresponding in number to the number of inductive load phases. The solid state switching devices in each pair of inverter main solid state switching devices are coupled in series-aiding fashion, each pair being coupled across the current source with the junction between solid state switching devices in each pair being coupled to a respective inductive load phase. A first pair of auxiliary solid state switching devices is serially coupled across the current source with the junction between auxiliary solid state switching devices coupled to the inductive load neutral by a first commutating capacitance. Likewise, a second pair of inverter auxiliary solid state switching devices is serially coupled across the current source with the junction between auxiliary solid state switching devices coupled to the inductive load neutral by a second commutating capacitance. Means are coupled to each of the switching devices of the pairs of main solid state switching devices and to the switching devices of the pairs of inverter auxiliary solid state switching devices for rendering each of the main solid state switching devices conductive in a predetermined sequence and for rendering conductive, responsive to the conduction of a respective one of the main solid state switching devices, one of the switching devices of the first pair of inverter auxiliary solid state switching devices and one of the switching devices of the second pair of inverter auxiliary solid state switching devices in accordance with inverter load current to commutate the respective main solid state switching device by coupling respectively the first and second commutating capacitances, respectively, in series with a respective inductive load phase across the respective main solid state switching device.

It is an object of the present invention to provide an improved current fed inverter having commutation capacitance selectable as a function of load current and having extended inverter operating range as a result of reduced inverter commutation time.

It is another object of the present invention to provide an improved current fed inverter having commutation capacitance selectable as a function of load current and having reduced inverter commutation time while maintaining relatively low inverter component voltage levels.

BRIEF DESCRIPTION OF THE DRAWINGS

The features of the invention believed to be novel are set forth with particularly in the appended claims. The invention itself, however, both as to organization and method of operation, together with further objects and advantages thereof, may best be understood by reference to the following description taken in conjunction with the accompanying drawings in which:

FIG. 4a is a graphical illustration of inverter load current with respect to time, for the inverter of FIG. 3; and FIGS. 4b-4d are graphical illustrations of the first commutation capacitance voltage waveform, the second commutation capacitance waveform and the combined commutation capacitance voltage waveform, respectively, for the inverter of FIG. 3.

DETAILED DESCRIPTION OF THE PREFERRED EMBODIMENT

Figure 1:
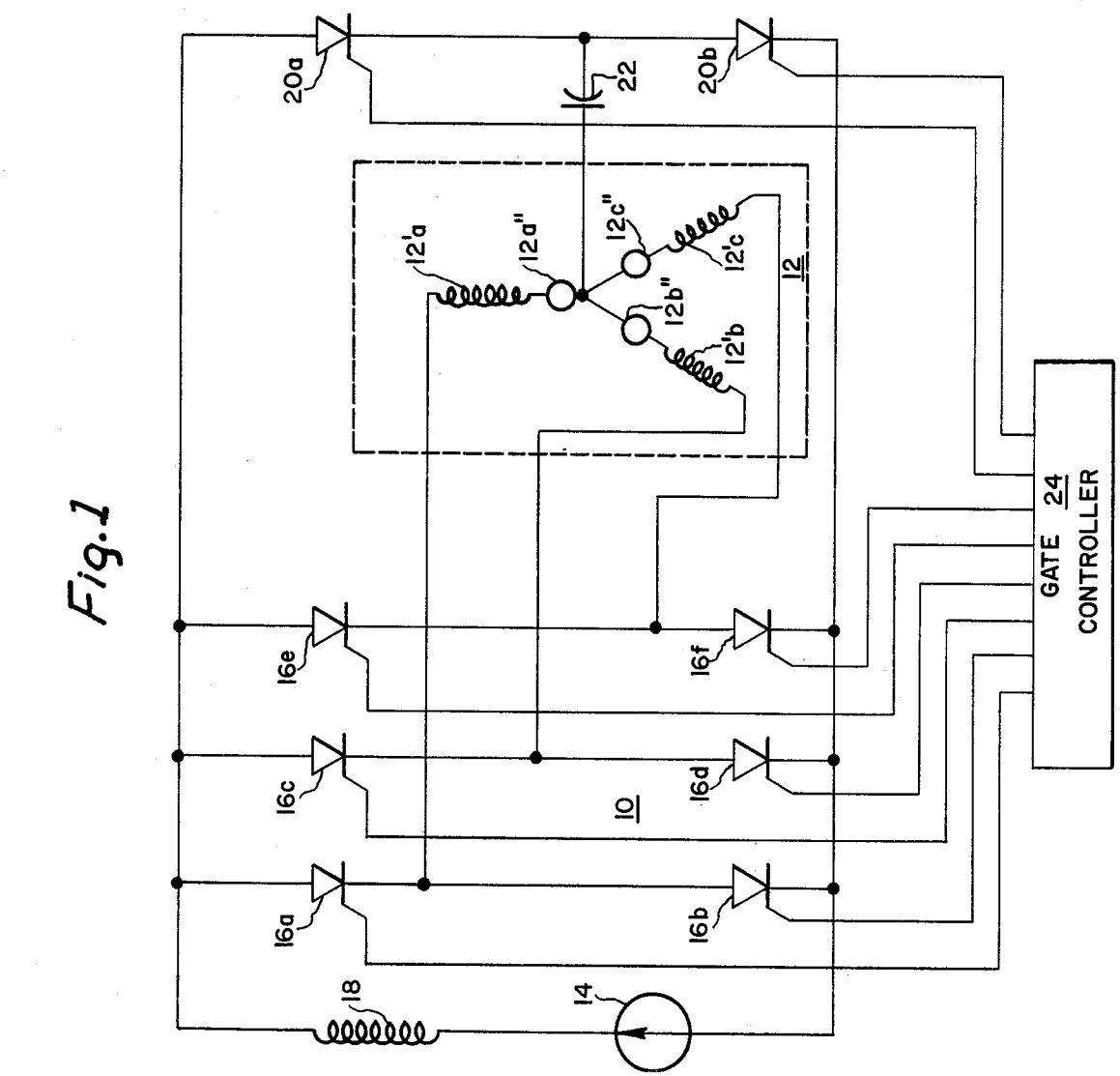
FIG. 1 is a schematic diagram of a third harmonic auxiliary commutated inverter according to the prior art.

FIG. 1 is a schematic diagram of a third harmonic auxiliary commutated inverter 10 according to the prior art for supplying a wye-connected inductive load, such as an over-excited synchronous machine 12, with alternating current from a unidirectional current source 14, typically either a battery or a phase controlled rectifier. Inverter 10 comprises a plurality of pairs of controlled, unidirectional, solid state switching devices, such as thyristors, corresponding in number to the number of phases of machine 12. Typically, machine 12 comprises a three phase wye-connected over-excited synchronous machine with each machine phase represented by a respective one of inductances 12a' 12b' and 12c' coupled in series with a respective one of voltage sources 12a ", 12b" and 12c", each voltage source representing the respective phase component of machine back EMF. Therefore, inverter 10 comprises three pairs of thyristors, such as thyristors 16a and 16b, 16c and 16d and 16e and 16f, the thyristors in each thyristor pair being coupled in series aiding fashion and each pair of thyristors being coupled across the series combination of current source 14 and a filter inductance 18. The junction between thyristors of each thyristor pair is coupled to a respective phase of machine 12.

Inverter 10 also includes a pair of auxiliary thyristors 20a and 20b which are coupled in series aiding fashion across the series combination of current source 14 and filter inductance 18. A capacitance 22 is coupled to the junction of thyristors 20a and 20b and to the neutral of machine 12. During initial machine start up, capacitance 22 is charged and provides a reverse bias potential to commutate one of thyristors 16a, 16c and 16e or one of thyristors 16b, 16d and 16f when a respective one of thyristors 20a and 20b is rendered conductive.

Thyristors 16a through 16f and thyristors 20a and 20b are rendered conductive in a predetermined sequence by gate controller 24 which is coupled to the gate of each thyristor. Various thyristor firing circuits exist and selection of such a thyristor firing circuit depends on design parameters. Therefore, the details of gate controller 24 are not set forth. For a further, more detailed description of such thyristor firing circuits, reference should be made to Chapter IV of the *General Electric Silicon Controlled Rectifier Handbook* published by Semiconductor Products Department of General Electric Company, Syracuse, New York (1973).

Figure 2A:
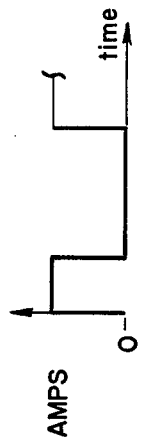
FIGS. 2a-2h are graphical representations with respect to time of the conduction of each of the thyristors of the inverter of FIG. 1.
Figure 2B:
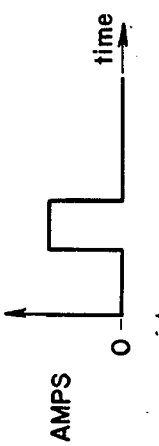
Figure 2C:
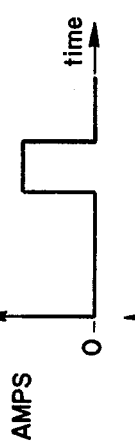
Figure 2D:
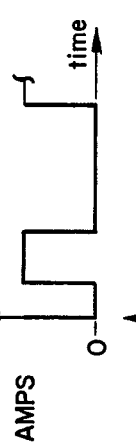
Figure 2E:
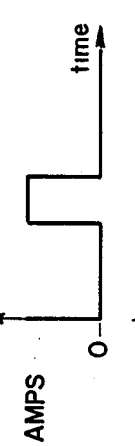
Figure 2F:
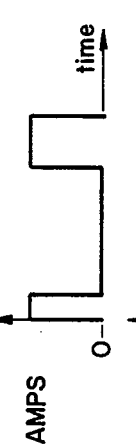
Figure 2G:
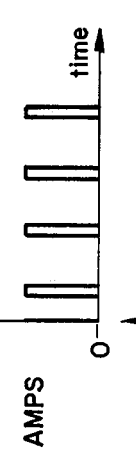
Figure 2H:
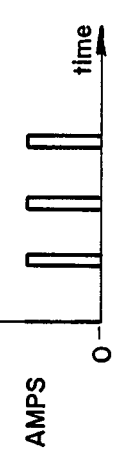

Operation of inverter 10 may best be understood by reference to FIGS. 2a through 2h which illustrate the conduction interval of thyristors 16a, 16c, 16e, 16f, 16d, 16b, 20b and 20a, respectively. Referring now to FIGS. 2a through 2f, machine 12 is supplied with alternating currents which are in a three phase relationship with one another when gate controller 24 of FIG. 1 sequentially renders thyristors 16a, 16c and 16e and thyristors 16f, 16b and 16d sequentially conductive with thyristors 16f, 16b and 16d being rendered conductive after an interval of duration of approximately 1/6 f commencing from initiaton of conduction of thyristors 16a, 16c and 16e where f is the frequency of thyristor conduction. Initially, machine back EMF is low and thyristors 20b and 20a are alternately rendered conductive as illustrated in FIGS. 2g and 2h, respectively, to commutate a then-conductive one of thyristors 16b, 16d and 16f and thyristors 16a, 16c and 16e, respectively. As may be observed from FIGS. 2g and 2h, thyristors 20b and 20a, respectively, are alternately rendered conductive at a frequency three times the conduction frequency of thyristors 16a through 16f, respectively.

The thyristor conduction sequence described above is continuously repeated. Machine 12, now excited, commences rotation. As the rotational speed of machine 12 increases, machine back EMF increases proportionately, to a magnitude sufficient to commutate a then-conductive one of thyristors 16a through 16f, at which time conduction of thyristors 20a and 20b is discontinued. Thereafter, each of inverter thyristors 16a through 16f continues to be commutated at an appropriate time by synchronous machine back EMF.

The auxiliary thyristor commutation time, that is, the interval beginning when one of thristors 20a and 20b becomes nonconductive and terminating when the remaining auxiliary thryristor becomes conductive, varies as a function of inverter load current, machine inductance, and commutating capacitance 22 voltage to reverse polarity is greater than the time required for the commutating capacitance voltage polarity to reverse at high current. However, if the commutation voltage polarity reversal time requires more than 1/6 f seconds, the nonconductive auxiliary thyristor may be rendered conductive prior to commutation of the conductive inverter auxiliary thyristor, causing both auxiliary thyristors to become simultaneously conductive, thereby. Since the time required to commutate an auxiliary thyristor is dependent on the magnitude of commutating capacitance 22, the current range of inverter 10 is limited by the size of the commutating capacitance magnitude as well as the magnitude of current, hereinafter referred to as inverter link current supplied by current source 14.

Figure 3:
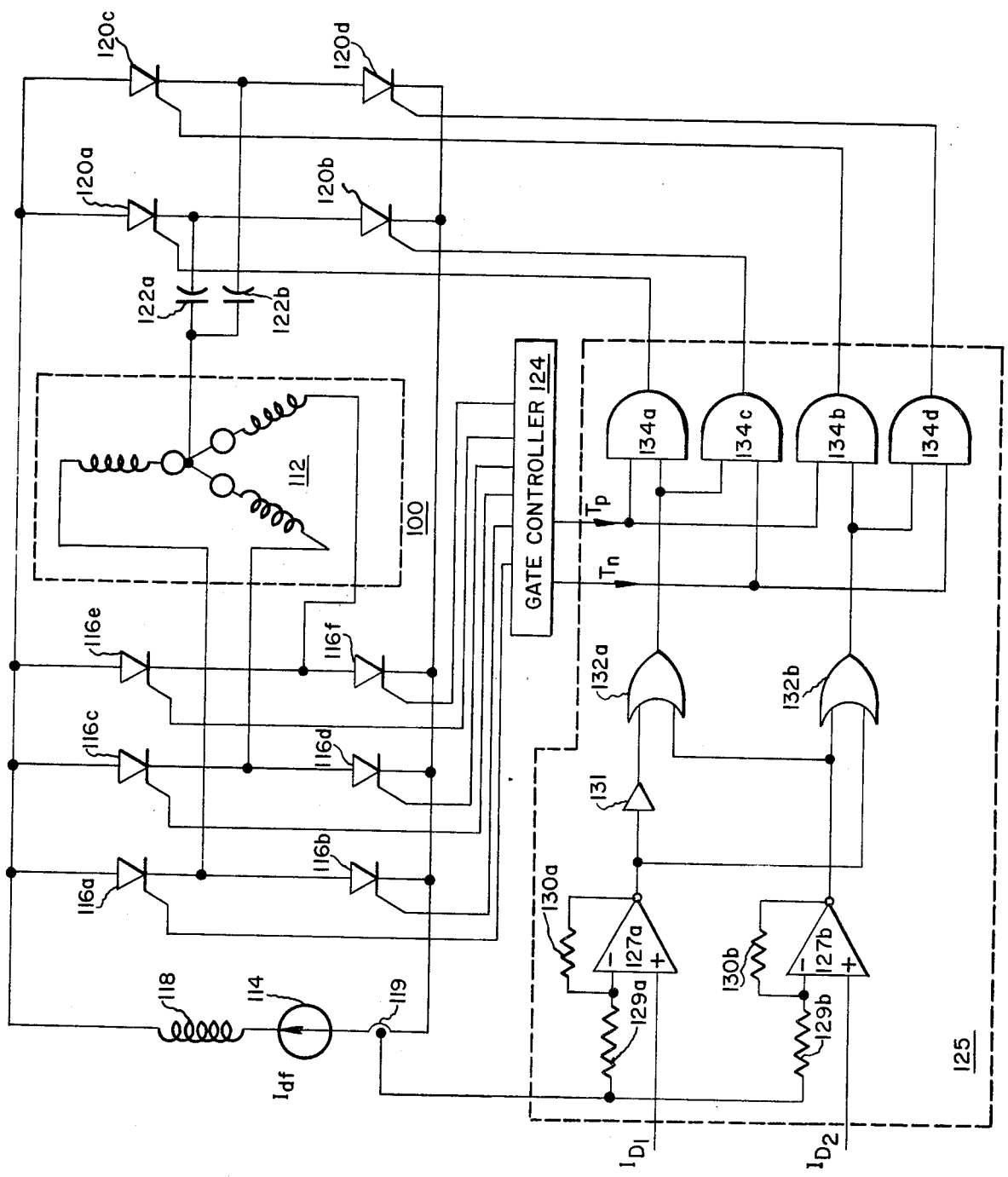
FIG. 3 is a schematic diagram of a third harmonic auxiliary commutated inverter according to the present invention.

FIG. 3 illustrates an improved current fed third harmonic auxiliary commutated inverter 100 having selectable commutation capacitance as a function of load current for supplying alternating current to an inductive load, such as synchronous machine 112, from a source 114 of unidirectional current. Inverter 100 comprises a plurality of pairs of solid state switching devices, such as thyristors, the number of thyristor pairs corresponding to the number of phases of synchronous machine 112. Typically, machine 112 comprises an over-excited three phase synchronous machine which is configured identically to synchronous machine 12 of FIG. 1. Therefore, inverter 100 comprises three pairs of thyristors such as thyristors 116a and 116b, 116c and 116d and 116e and 116f, the thyristors in each thyristor pair coupled in series aiding fashion and each pair of thyristors being coupled across the series combination current source 114, a filter inductance 118, and a current sensor 119 whose function will become better understood hereinafter. The junction between thyristors of each thyristor pair of coupled to a respective phase of machine 112.

Inverter 100 also includes two pairs of auxiliary thyristors 120a and 120b and 120c and 120d, the thyristors in each thyristor pair coupled in series aiding fashion, and each pair of auxiliary thyristors being coupled across the serial combination current source 114, filter inductance 118 and current sensor 119. The junction of thyristors 120a and 120b is coupled to the neutral of machine 112 by a first commutating capacitance 122a while the junction of thyristors 120c and 120d is coupled to the induction machine neutral by a second commutating capacitance 122b. Typically, capacitance 122a is of a lesser magnitude than capacitance 122b.

Inverter thyristors 116a through 116f are each coupled at the thyristor gate to receive thyristor firing signals from main gate controller 124 which is configured identically to gate controller 124 of inverter 10 illustrated in FIG. 1. Accordingly, during inverter 100 operation, thyristors 116a through 116f are rendered conductive in a sequence analogous to that described for thyristors 16a through 16f of inverter 10 illustrated in FIG. 1, to supply machine 112 with a three phase alternating current.

Each of auxiliary thyristors 120a, 120b, 120c and 120d is coupled at the gate to receive firing signals from auxiliary thyristor gate controller 125 which is coupled to main gate controller 124 and to current sensor 119. In response to positive and negative auxiliary thyristor gate signals, designated $T_P$ and $T_N$, respectively, generated by gate controller 124 to command commutation of a then conductive inverter main thyristor, auxiliary gate controller 125 renders one or both of auxiliary thyristors 120a and 120c or one or both of auxiliary thyristors 120b and 120d, respectively, conductive in accordance with the inverter link 114 current magnitude, designated $I_{df}$. Rendering thyristors 120a and 120b conductive in accordance with auxiliary thyristor gating signals $T_P$ and $T_N$, respectively, couples commutating capacitance 122a in series with a respective phase of machine 112 across a then conductive one of inverter main thyristors 116a, 116c and 116e and across a then conductive one of thyristors 116b, 116d and 116f, respectively. Likewise, when one of thyristors 120c and 120d is rendered conductive, commutation capacitance 122b is coupled in series with a respective phase of machine 112 across a then conductive inverter main thyristor. When both of auxiliary thyristors 120a and 120c or when both of auxiliary thyristors 120b and 120d are rendered conductive, commutation capacitances 122a and 122b are effectively coupled in parallel to commutate a then conductive main inverter thyristor.

Auxiliary thyristor gate controller 125 comprises a pair of identically configured comparators 127a and 127b, each comparator being coupled at the invert input by a respective one of resistances 129a and 129b to current sensor 119. Comparators 127a and 127b are each coupled at the noninvert comparator input to a reference signal source (not shown) to receive a respective one of reference signals $I_{D1}$ and $I_{D2}$ which are proportional to first and second preset inverter link current magnitudes, respectively. Each comparator is coupled at the output to the invert comparator input by a respective one of resistances 130a and 130b which are each typically 100 times larger in magnitude than a respective one of resistances 129a and 129b. By supplying a portion of the comparator output voltage to the invert comparator input, the output voltage of each comparator is hysteresis limited which greatly reduces the likelihood of an erroneous comparator output voltage deviation when extraneous voltages appear at either of the invert and noninvert comparator inputs.

A NOT gate 131 couples the output of comparator 127a to the first input of a two input OR gate 132a, the second input of which is coupled to the output of comparator 127b. A second two input OR gate 132b is coupled at the first input to the output of comparator 127b, the second input of OR gate 132b being coupled to the output of comparator 127a. The output of OR gate 132a is coupled to the first input of each of a pair of two input AND gates 134a and 134c, respectively. The output of OR gate 132b is coupled to the first input of each of a second pair of two input AND gates 134b and 134d, respectively. The remaining input of each of AND gates 134a and 134c is coupled to gate controller 124 to receive positive auxiliary thyristor gating signals $T_P$. The remaining input to each of AND gates 134b and 134d is coupled to gate controller 124 to receive negative thyristor gating signals $T_N$. Each of AND gates 134a through 134d is coupled to the gate of a respective one of thyristors 120a, 120c, 120b and 120d.

The operation of inverter 100 may best be understood by reference to FIGS. 4a, 4b, 4c and 4d. To supply alternating current to induction machine 112, gate controller 124 supplies gating signals to each of inverter main thyristors 116a through 116f to render the thyristors conductive in a sequence analogous to that described for thyristors 16a through 16f of inverter 10 of FIG. 1. Each of inverter main thyristors 116a, 116c and 116e and each of inverter main thyristors 116b, 116d and 116f is commutated at an appropriate instant following initiation of thyristor conduction when a respective one or both of auxiliary thyristors 120a and 120c and of auxiliary thyristors 120b and 120d is rendered conductive, respectively, as follows. Initially, when inverter link current $I_{df}$ is of a lesser magnitude than the first preset inverter link current $I_{D1}$, as shown in FIG. 4a, then each of comparators 127a and 127b produces a logical "zero" level output voltage, resulting in the output voltage of OR gates 132a and 132b being at a logical "one" and a logical "zero" level, respectively. Thus, each time gate controller 124 generates a positive or a negative auxiliary thyristor firing signal $T_P$ or $T_N$, respectively, only a respective one of auxiliary thyristors 120a and 120b is rendered conductive. Rendering a respective one of thyristors 120a and 120b conductive couples commutation capacitance 122a in series with a respective phase of machine 12 across a then conductive main thyristor. With a respective one of auxiliary thyristors 120a and 120b being rendered conductive to commutate then conductive main thyristor, the voltage across commutation capacitance 122a, the waveform of which is shown in FIG. 4b, is alternately positive and negative in accordance with the conductivity of a respective one of thyristors 120a and 120b. The voltage across commutation capacitance 122b, the waveform of which being illustrated in FIG. 4, remains at a positive, constant magnitude as neither of thyristors 120c nor 120b becomes conductive at this time.

Once the inverter link current magnitude exceeds the first reference inverter link current magnitude $I_{D1}$, then the output voltage of comparator 127a changes from a logical "zero" level to a logical "one" level causing the output voltage of OR gates 132a and 132b to changes from a logical "one" to a logical "zero" level and from a logical "zero" level to a logical "one" level, respectively. Now, when gate controller 124 generates a positive or negative auxiliary thyristor gating signal $T_P$ or $T_N$, respectively, only a respective one of thyristors 120c and 120d is rendered conductive. Rendering a respective one of thyristors 120c and 120d conductive couples commutating capacitance 122b in series with a respective phase of machine 112 across a then conductive main inverter thyristor to commutate the same. As illustrated in FIG. 4c, the voltage across commutating capacitance 122b now is alternately positive and negative in accordance with the conductivity of a respective one of thyristors 120c and 120d while the voltage across commutating capacitance 122a, as illustrated in FIG. 4b, becomes positive and constant as neither of thyristors 120a nor 120b is conductive.

Should the magnitude of inverter link current exceed the magnitude of the second reference inverter link current $I_{D2}$, then the output voltage of comparator 127b changes from a logical "zero" level to a logical "one" level causing the output voltage of OR gate 132a to changes from a logical "zero" to a logical "one" level. Now, when gate controller 124 generates a positive or negative auxiliary thyristor gating signal, both of auxiliary thyristors 120a and 120c or both of auxiliary thyristors 120b and 120d, respectively, are rendered conductive to couple the parallel combination of capacitances 122a and 122b in series with a respective phase of machine 112 across a then conductive main thyristor to commutate the same. With both of auxiliary thyristors 120a and 120c or both of auxiliary thyristors 120b and 120d conductive, the voltage across each of commutating capacitances 122a and 122b, as illustrated in FIGS. 4b and 4c, respectively, is alternately positive and negative in accordance with the conductivity of thyristor pairs 120a and 120c and 120b and 120d, respectively.

Referring to FIG. 4d, the equivalent commutation capacitance voltage is exactly the voltage across commutating capacitance 122a during intervals when $I_{df} > I_{D1}$ while during intervals when $I_{D1} < I_{df} < I_{D2}$ the equivalent commutation capacitance voltage is exactly the voltage across commutating capacitance 122b. When $I_{df} > I_{D2}$, the effective commutation capacitance voltage is the voltage across a capacitance of a magnitude equal to the sum of capacitances 122a and 122b.

As may be observed from FIGS. 4a and 4b, the peak voltage across capacitances 122a and 122b, respectively, remain relatively constant during inverter operation. It should be noted that no possibility of transient currents between capacitors 122a and 122b exists as one of the auxiliary thyristors will be reverse biased if the commutating capacitance voltage is unequal. Thus, when the parallel combination of commutating capacitances 122a and 122b are coupled in series with a respective machine phase across a then conductive inverter main thyristor, the commutating capacitance with the largest stored charge first supplies potential to reverse bias a then-conductive main thyristor until the voltage across the other commutating capacitance becomes equal in magnitude, thereby eliminating the chance of inverter failure.

Operating as described above, inverter 100 is advantageously provided with a low commutation capacitance at low currents and a higher commutation capacitance at higher currents which decreases inverter commutation time thereby extending the range of inverter operation. Since inverter 100 commutating capacitance voltage levels remain relatively constant during inverter 100 operation, inverter thyristor voltage levels remain low, and thyristor over voltage is prevented.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed is:

1. An improved current fed inverter having selectable commutation capacitance as a function of load current for supplying alternating current to a wye-connected, polyphase, inductive load from a source of unidirectional current comprising:

a plurality of pairs of main solid state switching devices corresponding in number to the number of phases of said inductive load, the solid state switching devices in each pair of main solid state switching devices being coupled in series aiding fashion, each pair being coupled across said source of unidirectional current and having the junction therebetween coupled to a respective phase of said inductive load;

a first pair of auxiliary solid state switching devices coupled in series aiding fashion across said source of unidirectional current;

a first commutation capacitance coupled between the junction of solid state switching devices of said first pair of auxiliary solid state switching devices and the neutral of said wye-connected inductive load;

a second pair of inverter auxiliary solid state switching devices coupled in series aiding fashion across said source of unidirectional current;

a second commutation capacitance coupled between the junction of solid state switching devices of said second pair of auxiliary solid state switching devices and the neutral of said wye-connected inductive load;

first control means coupled to the solid state switching devices of said pairs of main solid state switching devices and rendering the solid state switching devices of said pairs of main solid state switching devices conductive in a predetermined sequence to supply said polyphase inductive load with alternating current; and second control means coupled to the solid state switching devices of said first and said second pair of auxiliary solid state switching devices, said second control means rendering conductive, responsive to the conduction of a respective one of said main solid state switching devices, one of the solid state switching devices of said first pair of auxiliary solid state switching devices and one of the switching devices of said one of said second pair of auxiliary solid state switching devices in accordance with inverter current to couple said first and said second commutation capacitances, respectively, in series with a respective load phase across said respective one of said main solid state switching devices to commutate said respective one of said main solid state switching devices.

2. The invention according to claim 1 wherein said first commutation capacitance is of a lesser magnitude than said second commutation capacitance.

3. The invention according to claim 1 wherein said first control means comprises a main gate controller circuit coupled to the solid state switching devices of said pairs of main solid state switching devices for supplying gating signals thereto to render the solid state switching devices of said pairs of main solid state switching devices conductive in said predetermined seauence and said second control means comprises:
  an auxiliary gate controller circuit coupled to said main gate controller circuit and to the solid state switching devices of said first and said second pair of auxiliary solid state switching devices, said auxiliary gate controller circuit supplying, in response to auxiliary gating signals generated by said main gate controller circuit, gating signals to each of the solid state switching devices of said first and said second pairs of auxiliary solid state switching devices to render one of the solid state switching devices conductive in each of said first and said second pairs of auxiliary solid state switching devices conductive in accordance with inverter link current.

4. The invention according to claim 3 wherein said auxiliary gate controller circuit comprises:
  first comparator means for providing a logic output voltage which varies in accordance with the magnitude deviation of inverter link current from a first preset inverter link current;
  second comparator means for providing a logic output voltage which varies in accordance with the magnitude deviation of inverter link current from a second preset inverter link current; and
  logic means coupled to said main gate controller circuit and to said first and said second comparator means for supplying gating signals to the solid state switching devices of said first and second pairs of auxiliary solid state switching devices.

5. For use with a third harmonic auxiliary commutated inverter configured of a plurality of pairs of main solid state switching devices, each of the solid state switching devices of said pairs being coupled in series aiding fashion, each pair being coupled across a source of unidirectional current and having the junction therebetween coupled to a respective phase of a wye-connected, polyphase, inductive load, each of the solid state switching devices of said pairs being rendered conductive by a main solid state switching device gate controller circuit in a predetermined sequence to supply alternating current to said wye-connected, polyphase, inductive load, main gate controller circuit generating auxiliary gating signals to command commutation of a then conductive inverter main solid state switching device comprising:
  a first pair of auxiliary solid state switching devices coupled in series-aiding fashion across said source of unidirectional current;
  a first commutating capacitance coupled to the junction between solid state switching devices of said first pair of auxiliary solid state switching devices and adapted for coupling to the neutral of said wye-connected, polyphase, inductive load;
  a second pair of auxiliary solid state switching devices coupled in series aiding fashion across said source of unidirectional current;
  a second communicating capacitance coupled to the junction between switching devices of said second pair of auxiliary solid state switching devices and adapted for coupling to the neutral of said wye-connected, polyphase, inductive load; and
  an auxiliary gate controller circuit coupled to said main gate controller circuit and to each of the solid state switching devices of said first and said second pair of auxiliary solid state switching devices for rendering conductive, responsive to conduction of one of the solid state switching devices of said pairs of inverter main solid state switching devices, one of the solid state switching devices in each of said first and said second pairs of auxiliary solid state switching devices in accordance with inverter current to commutate a then conductive one of the solid state switching devices of said pairs of inverter main solid state switching devices.

6. The invention according to claim 5 wherein said auxiliary gate controller circuit comprises:
  first comparator means for providing a logic output voltage which varies in accordance with magnitude deviation of inverter link current from a first preset inverter link current;
  second comparator means for providing a logic output voltage which varies in accordance with magnitude deviation of inverter link current from a second preset inverter link current; and
  logic means coupled to said main solid state switching device gate controller circuit and to said first and said second comparator means for supplying gating signals to the solid state switching devices of said first and second pairs of auxiliary solid state switching devices.

* * * * *